United States Patent
Boyd

(10) Patent No.: US 7,021,244 B2
(45) Date of Patent: Apr. 4, 2006

(54) PET REPELLING MAT

(75) Inventor: Randal D. Boyd, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 33 days.

(21) Appl. No.: 10/426,503

(22) Filed: Apr. 30, 2003

(65) Prior Publication Data

US 2004/0216694 A1    Nov. 4, 2004

(51) Int. Cl.
*A01K 15/04* (2006.01)
*A01K 15/02* (2006.01)

(52) U.S. Cl. ............................ 119/721; 119/720; 119/859

(58) Field of Classification Search ................ 119/720, 119/721, 908, 859; 52/101; 340/572.5, 340/572.1; 600/595
See application file for complete search history.

(56) References Cited

U.S. PATENT DOCUMENTS

| 4,870,391 A | * | 9/1989 | Cooper ................... 340/572.5 |
| 5,453,745 A | * | 9/1995 | Kudo et al. ..................... 342/1 |
| 5,573,012 A | * | 11/1996 | McEwan .................... 600/595 |
| 5,575,242 A | * | 11/1996 | Davis et al. ................ 119/721 |
| 5,636,597 A | * | 6/1997 | Van Curen et al. ......... 119/720 |
| 5,959,595 A | * | 9/1999 | Witschen et al. ........... 343/912 |
| 6,158,392 A | * | 12/2000 | Andre et al. ................ 119/721 |
| 6,615,770 B1 | * | 9/2003 | Patterson et al. ........... 119/721 |
| 2002/0073933 A1 | * | 6/2002 | Oakman ..................... 119/721 |
| 2003/0094959 A1 | * | 5/2003 | Hoisington et al. ......... 324/694 |

OTHER PUBLICATIONS

Scat Mat- Training Aids for Pets, version relased in 2000 www.hdw-inc.com/scatmat.htm.*
Pet Safe, Scat Mat Owners Manual #400-414/A // www.petsafe.net.

* cited by examiner

*Primary Examiner*—Teri Pham Luu
*Assistant Examiner*—Elizabeth Shaw
(74) *Attorney, Agent, or Firm*—Pitts & Brittian, P.C.

(57) ABSTRACT

Described is a pet-repellent device for correcting undesirable pet behaviors that are associated with a particular location by restraining a pet from approaching a predefined location of restriction, which corresponds to the particular location of issue. The location of restriction, for practical purposes, is defined by a mat. A receiver that is carried by a pet administers a deterrent to the pet when the pet approaches the mat. Because the predefined location of restriction is defined by a portable mat, the predefined location of restriction is easily relocated in accordance with changing undesired pet behaviors that are associated with a particular location.

12 Claims, 3 Drawing Sheets

PET REPELLING MAT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device for correcting the undesired behaviors of a pet that are relative to a specific isolated location. More particularly, this invention pertains to a device for restraining a pet from approaching a portable predefined location of restriction by administering a deterrent to the pet as it approaches the predefined location of restriction.

2. Description of the Related Art

Many domestic pets present undesirable behaviors that are related to and dependent on a particular isolated location. Some examples of this type of behavior include a dog eating the food of a cat or a pet toppling a trashcan. It is understood that restraining the pet from approaching the particular isolated location relating to the undesired behavior would eliminate the behavior. It is also understood that pets without behavior problems need not and, in some situations, cannot be restricted from the particular location of interest. One traditional solution to this issue is to restrain the pet with the undesired behavior from the particular location by positioning a fence, gate, or other physical-type boundary around the particular location. This solution is limited in that it is space consuming, decoratively unappealing, and potentially destroyable or surmountable by the pet under consideration. Additionally, this approach restricts all pets, not just the pet with an undesirable behavior, from accessing the particular location.

Another conventional solution to the issue of correcting the undesired behaviors of a pet that are relative to a specific isolated location is the implementation of an invisible restraint, which is typically referred to as an invisible fence. Conventional invisible restraints include an insulated conductive wire, a transmitter, and a receiver. The wire is disposed such that it defines the perimeter of the desired area of restriction and serves as an antenna for the transmitter, which emits a radio signal that produces and electromagnetic field that radiates from the wire. The receiver is worn by a pet and is responsive to the electromagnetic field such that as the equipped pet approaches the wire, the receiver detects the field and administers a deterrent to the pet, thus restraining the pet from continuing toward the restricted area.

Conventional invisible restraints are limited in that they require time-consuming installation and become locationally fixed upon installation. The outdoor installation of a conventional invisible restraint typically includes positioning the wire to define the perimeter of the desired area of restriction, digging a trench for the wire, placing the wire in the trench, filling the trench with soil, connecting the wire to the transmitter, inserting batteries into the appropriate components, and attaching the receiver to a pet. Additionally, once the wire is buried, it cannot be repositioned without unearthing the wire. The indoor installation includes manually positioning the wire to define the perimeter of the desired area of restriction, connecting the wire to the transmitter, inserting batteries into the appropriate components, and attaching the receiver to a pet. However, upon installation, an exposed wire surrounds the restricted area. This wire is susceptible to being inadvertently moved from its desired position or tripped over by a passerby.

Conventional pet correction mats also propose a solution to the issue of correcting the undesired behaviors of a pet that are relative to a specific isolated location. A pet correction mat discourages a pet from touching the mat by administering a static stimulation to the pet when the pet contacts the mat. Therefore, when a pet correction mat is positioned at the desired area of restriction, a pet cannot access the restricted area without receiving a static stimulus, thus restraining the pet. Because a pet correction mat administers a static stimulus to anything that contacts the mat, a pet correction mat cannot distinguish between the pet with an undesired behavior and a pet that needs no discipline. Therefore, a conventional pet correction mat prevents pets without behavior problems and even humans from accessing the desired area of restriction. This condition limits the pet correction mat from being of value for situations such as the previously discussed examples of a dog eating a cat's food or a dog toppling a trashcan.

BRIEF SUMMARY OF THE INVENTION

In accordance with the various features of the present invention there is provided a pet-repellent device for correcting undesirable pet behaviors that are associated with a particular location by restraining a pet from approaching a predefined location of restriction, which corresponds to the particular location of issue. The perimeter of the location of restriction is defined by a wire that serves as an antenna for broadcasting a signal that is produced by a signal generating device. The wire is carried by a portable mat such that the mat, for practical purposes, substantially defines the location of restriction. A receiver that is carried by a pet is responsive to the signal produced by the signal generating device such that as the equipped pet approaches the predefined location of restriction, the receiver detects the signal that is broadcast by the wire and administers a deterrent to the pet, thus restraining the pet from continuing toward the location of restriction. Because the wire is carried by a portable mat, the predefined location of restriction is easily relocated in accordance with changing undesired pet behaviors that are associated with a particular location. Additionally, the pet-repellent device requires substantially no installation other than attaching the receiver to a pet and placing the mat at the desired restricted area.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
FIG. 1 is an illustration of a pet-repellent mat constructed in accordance with various features of the present invention and a dog wearing a receiver collar.
Figure 1:
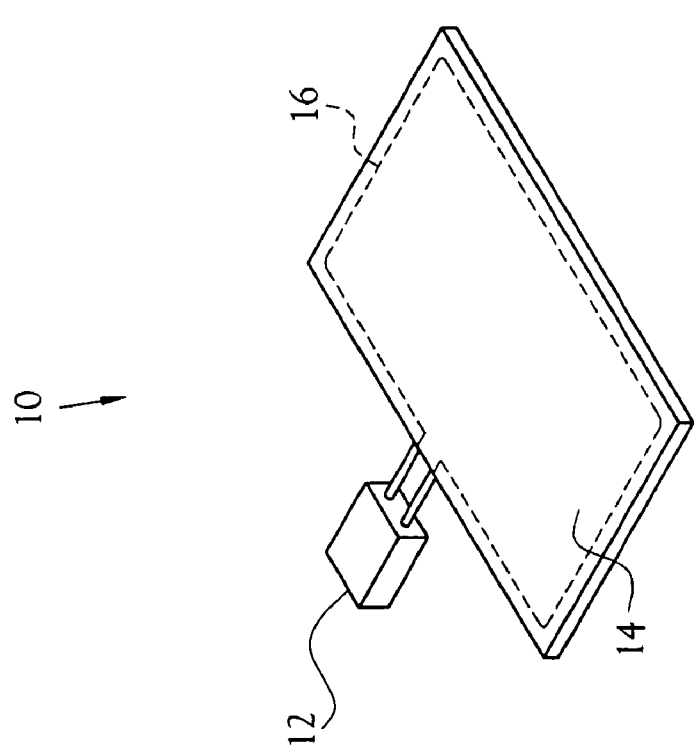

One embodiment of a pet-repellent mat for correcting undesirable pet behaviors that are associated with a particular restricted area and constructed in accordance with various features of the present invention is illustrated generally at 10 in FIG. 1. The perimeter of the location of restriction is defined by a wire that serves as an antenna for broadcasting a signal that is produced by a signal generating device. The wire is carried by a portable mat such that the mat, for practical purposes, substantially defines the location of restriction. A receiver that is carried by a pet is responsive to the signal produced by the signal generating device such that as the equipped pet approaches the predefined location of restriction, the receiver detects the signal that is broadcast by the wire and administers a deterrent to the pet, thus restraining the pet from continuing toward the restricted area. Because the wire is carried by a portable mat, the predefined location of restriction is easily relocated in accordance with changing undesired pet behaviors that are associated with a particular location. Additionally, the pet-repellent device 10 requires substantially no installation other than attaching the receiver to a pet and placing the mat at the desired location of restriction.

More specifically, FIG. 1 illustrates a perspective view of the pet-repellent device or mat 10 in accordance with the various features of the present invention. The pet-repellent device 10 includes a signal generating device 12 that is in electrical communication with a wire 16 such that the wire 16 serves as an antenna for broadcasting the signal that is produced by the conventional signal generating device 12. In this particular embodiment, the signal produced by the signal generating device 12 is a radio signal that generates an electromagnetic field that radiates from the wire 16. The wire 16 defines the perimeter of the location of restriction and, in the illustrated embodiment, is disposed along the outer edge of a mat 14 such that the mat 14 substantially defines the location of restriction. In the illustrated embodiment, the wire 16 is embedded within the mat 14, however, those skilled in the art will recognize that other ways of adapting the wire 16 to be carried by the mat 14 can be used without interfering with the scope or spirit of the present invention. Additionally, those skilled in the art will recognize that variations in the geometry of the wire 16 with regard to the mat 14 can be used as desire.

The pet-repellent mat 10 also includes a conventional receiver 18 that is carried by a pet. In the illustrated embodiment, the receiver 18 is attached to a pet by way of a collar, however, those skilled in the art will recognize that other ways of attaching the receiver 18 to a pet can be used. The receiver 18 is responsive to the electromagnetic field that radiates from the wire 16 such that as the receiver 18 approaches the wire 16, the receiver 18 detects the electromagnetic field and administers a deterrent to the equipped pet. The distance between the receiver and the antenna wire required for triggering the pet deterrent signal can be selected by varying the strength of the transmittal signal and/or the sensitivity of the receiver. The type of deterrent signal can be selected and may include the emission of a substantially loud noise, an electric stimulus, or a verbal command that is prerecorded by the pet owner. Therefore, when an equipped pet moves to close to the predefined location of restriction, a deterrent restrains the pet from continuing toward the restricted location. Those skilled in the art will recognize that the type of deterrent, as long as effective and safe for the pet, can be chosen by the user.

Figure 2:
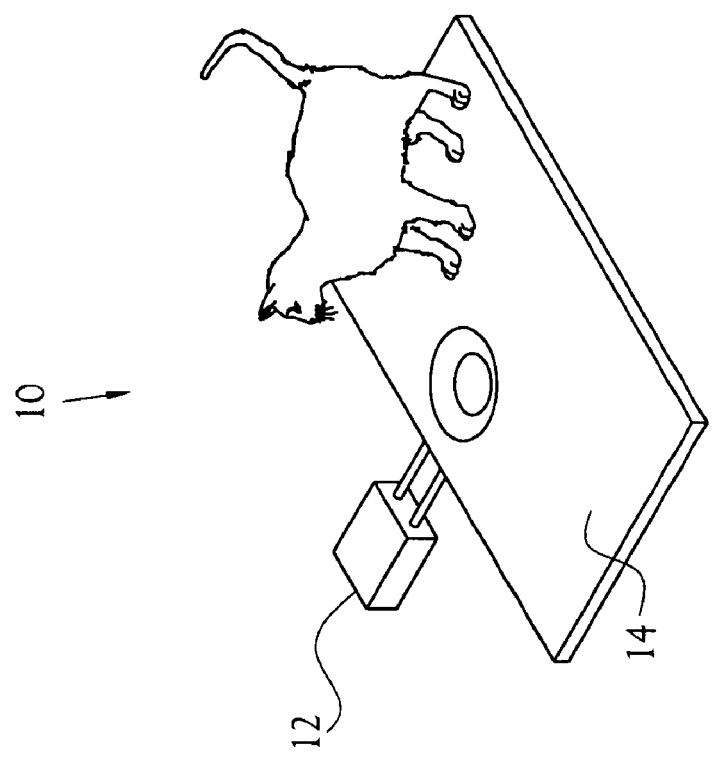
FIG. 2 illustrates the pet-repellent device of FIG. 1 restraining a dog from approaching a cat food bowl.
Figure 2:
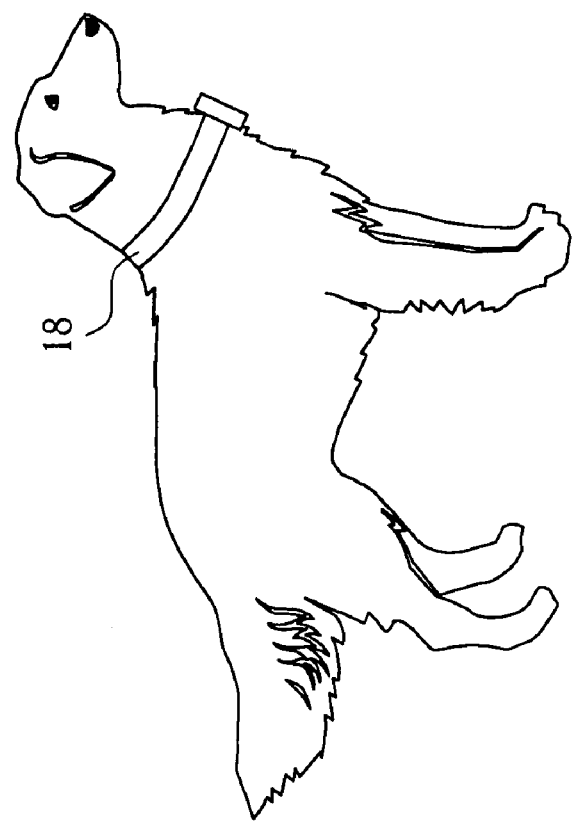
Figure 3:
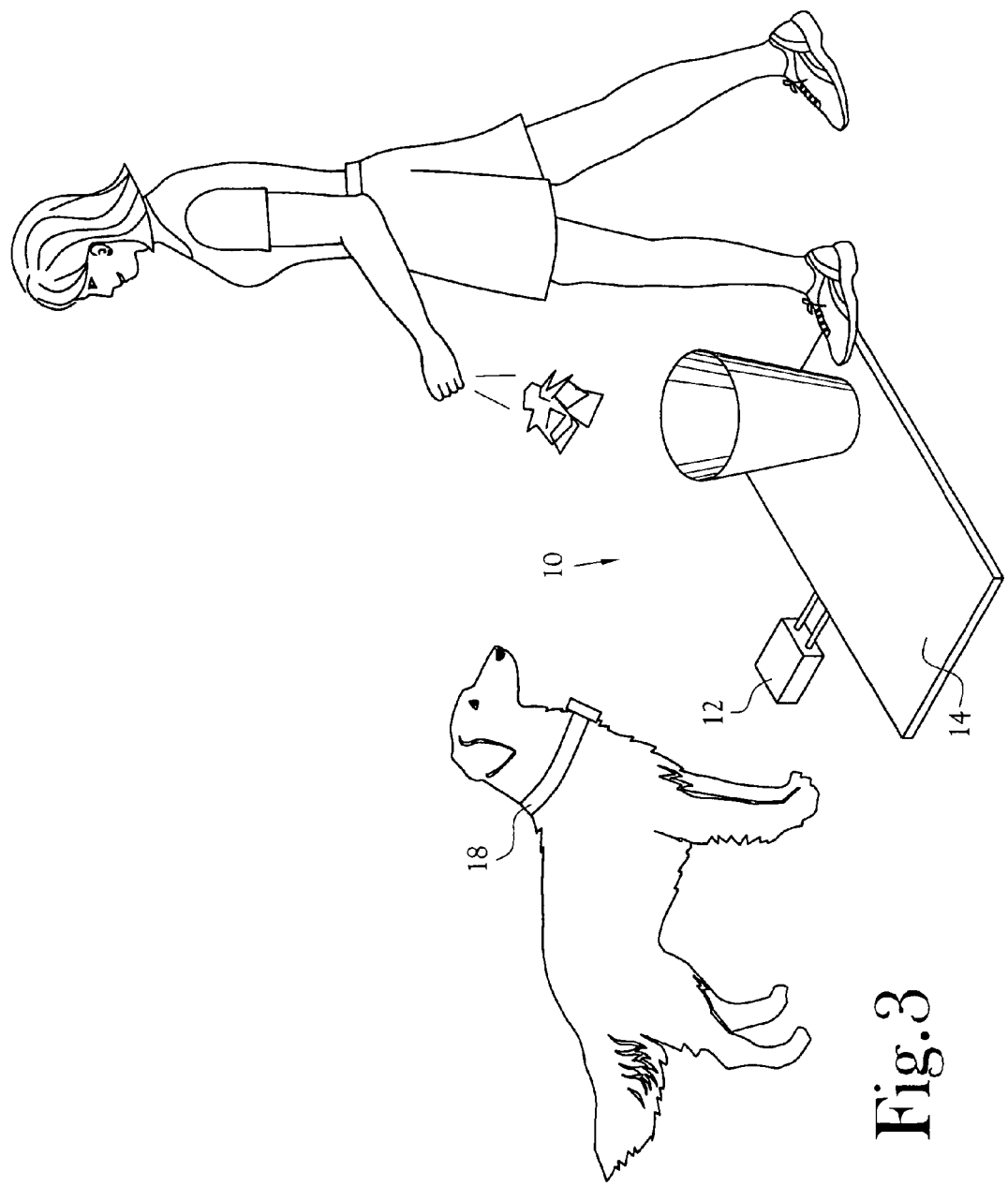
FIG. 3 illustrates the pet-repellent device of FIG. 1 restraining a dog from approaching a trashcan.

As an example illustrated in FIG. 2, the particular undesired behavior of the illustrated dog is that the dog repeatedly eats the food of the illustrated cat. When the receiver 18 is attached to the dog and the illustrated cat food bowl is placed on the mat 14, the dog cannot approach the mat 14 without receiving a deterrent, thus restraining the dog from approaching the mat 14 and preventing the dog from eating the food of the cat. Because the cat does not carry a receiver 18, the cat is able to approach and penetrate the location of restriction defined by the mat 14 without being subject to a deterrent. Similarly, as illustrated in FIG. 3, the particular undesired behavior is that the illustrated dog is repeatedly toppling a trashcan. When the receiver 18 is attached to the dog and the illustrated trashcan is placed on the mat 14, the dog cannot approach the mat 14 without receiving a deterrent, thus restraining the dog from approaching the mat 14 and preventing the dog from toppling the trashcan. Moreover, the illustrated person is able to access the predefined location of restriction without being subject a deterrent.

The installation of the pet-repellent device 10 is accomplished by inserting batteries into the appropriate components, attaching the receiver 18 to a pet, and placing the mat 14 at the desired location of restriction. The simplicity of the installation of the pet-repellent device 10 is indicative of the portability of the pet-repellent device 10. This portability allows a pet owner to easily adjust the location of the pet-repellent device 10 in accordance with the changing needs of the pet owner.

From the foregoing description, those skilled in the art will recognize that a device for restraining a pet from a predefined location of restriction offering advantages over the prior art has been provided. The device provides a mat that substantially defines a location of restriction and a receiver that is carried by a pet that administers a deterrent to the pet when the pet approaches the predefined location of restriction. Further, the device provides access to the location of restriction for pets that do not present an undesirable behavior. Finally, the device provides a pet-repellent device that requires substantially no installation, thus providing a highly portable location of restriction.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's invention.

I claim:

1. A pet-repellent device for restraining a pet from approaching a predefined location of restriction, said pet-repellent device comprising;
    a signal generating device;
    a mat adapted to serve as an antenna for broadcasting the signal produced by said signal generating device, said mat in electrical communication with said signal generating device; and
    a receiver carried by a pet, said receiver responsive to the signal broadcast by said mat such that as said receiver becomes proximate to said mat, said receiver administers a deterrent to the pet.

2. The pet-repellent device of claim 1 wherein said signal generating device produces a radio signal.

3. The pet-repellent device of claim 2 wherein said receiver is adapted to receive a radio signal.

4. A pet-repellent device for restraining a pet from approaching a predefined location of restriction, said pet-repellent device comprising:
   a signal generating device;
   a portable mat;
   a wire carried by said portable mat, said wire in electrical communication with said signal generating device such that said wire serves as a broadcasting antenna for said signal generating device; and
   a receiver carried by a pet, said receiver adapted to detect the signal broadcast by said wire when said receiver becomes substantially close to said wire, said receiver administering a deterrent to the pet upon detection of the signal broadcast by said wire.

5. The pet-repellent device of claim 4 wherein said wire is embedded within said mat.

6. The pet-repellent device of claim 4 wherein said wire is attached to a surface of said mat.

7. The pet-repellent device of claim 4 wherein said signal generating device produces a radio signal.

8. The pet-repellent device of claim 7 wherein said receiver is adapted to receive a radio signal.

9. The pet-repellent device of claim 1 or claim 4 wherein said receiver emits a substantially loud noise as a deterrent.

10. The pet-repellent device of claim 1 or claim 4 wherein said receiver administers an electric stimulus as a deterrent.

11. The pet-repellent device of claim 1 or claim 4 wherein said receiver increases the intensity of the deterrent as the distance between said receiver and said wire decreases.

12. A method for deterring a pet from approaching a portable predefined location of restriction, said method comprising the steps of:
   defining a location of restriction with a wire carried by a portable mat;
   generating a signal that is broadcast by the wire carried by the mat;
   attaching a receiver to a pet; and
   administering a deterrent to the pet by way of the receiver when the receiver becomes proximate to the defined location of restriction such that the receiver detects the signal broadcast by the wire.

* * * * *